United States Patent [19]
Aoki

[11] Patent Number: 5,703,725
[45] Date of Patent: Dec. 30, 1997

[54] COMPACT HIGH-PERFORMANCE ZOOM LENS

[75] Inventor: Masayuki Aoki, Oyama, Japan

[73] Assignee: Nikon Corporation, Tokyo, Japan

[21] Appl. No.: 552,195

[22] Filed: Nov. 2, 1995

[30] Foreign Application Priority Data

Nov. 14, 1994 [JP] Japan .................................. 6-304275

[51] Int. Cl.$^6$ .................................................. G02B 15/14
[52] U.S. Cl. ........................ 359/683; 359/688; 359/740; 359/737
[58] Field of Search ........................ 359/683, 688, 359/740, 737

[56] References Cited

U.S. PATENT DOCUMENTS

| | | | |
|---|---|---|---|
| 3,924,934 | 12/1975 | Grey | 359/686 |
| 4,281,906 | 8/1981 | Tanaka | 359/688 |
| 5,061,051 | 10/1991 | Miyamae | 359/683 |
| 5,383,058 | 1/1995 | Yonezawa | 359/687 |
| 5,414,562 | 5/1995 | Ueda | 359/683 |
| 5,579,172 | 11/1996 | Aoki et al. | 359/688 |
| 5,583,700 | 12/1996 | Usui et al. | 359/688 |

Primary Examiner—David C. Nelms
Assistant Examiner—Evelyn A. Lester
Attorney, Agent, or Firm—Klarquist Sparkman Campbell Leigh & Whinston, LLP

[57] ABSTRACT

A compact, high-performance zoom lens is disclosed. The zoom lens comprises four lens groups having positive, negative, negative, and positive refractive power, respectively. The lens groups are disposed so as to enable the zoom lens to produce an image of an object on an image plane over a range of magnifications from a wide-angle end to a telephoto end. The second and third lens groups move along the optical axis during zooming. The first lens group preferably includes, objectwise to imagewise, a negative lens element and first, second, and third positive lens elements. The zoom lens satisfies at least the following conditions:

$$0.6 < F_T^{1/2}(f_1/f_T) < 1.0$$

$$0.7 < |\beta_{2W} \cdot V^{+1}| < 1.1$$

wherein $f_1$ is the focal length of the first lens group, $F_T$ is the F-number of the zoom lens at the telephoto end, $\beta_{2W}$ is the lateral magnification of the second lens group at the wide-angle end, $f_T$ is the focal length of the zoom lens at the telephoto end, and V is the zoom ratio of the zoom lens.

18 Claims, 5 Drawing Sheets

FIG. 3A (I)  FIG. 3A (II)  FIG. 3A (III)  FIG. 3A (IV)

FIG. 3B (I)  FIG. 3B (II)  FIG. 3B (III)  FIG. 3B (IV)

FIG. 3C (I)  FIG. 3C (II)  FIG. 3C (III)  FIG. 3C (IV)

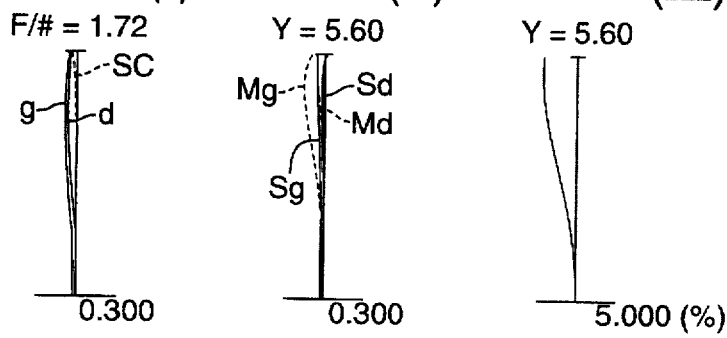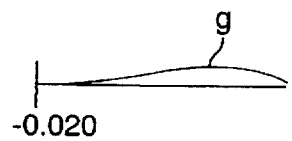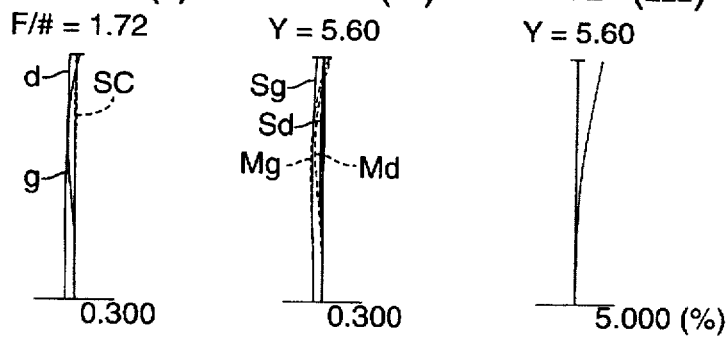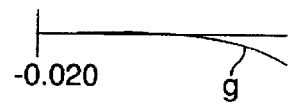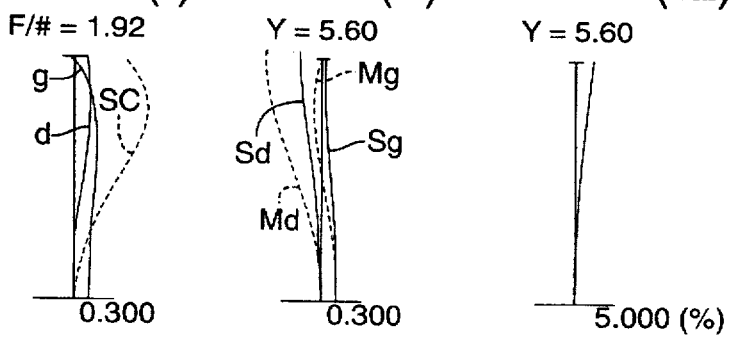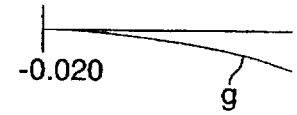

FIG. 5A (I)
FIG. 5A (II)
FIG. 5A (III)
FIG. 5A (IV)
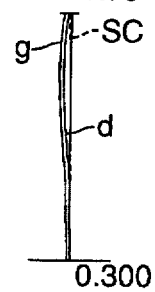
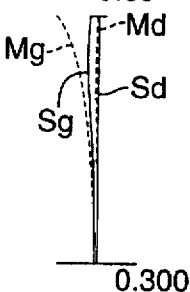
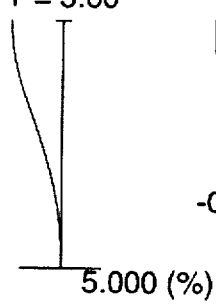
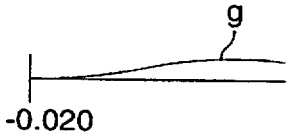
FIG. 5B (I)
FIG. 5B (II)
FIG. 5B (III)
FIG. 5B (IV)
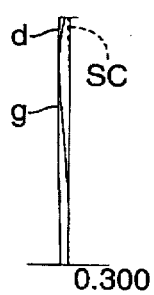
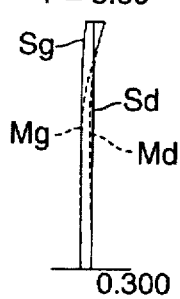
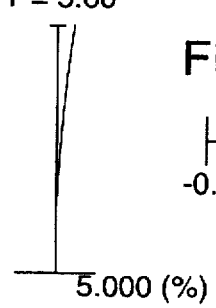
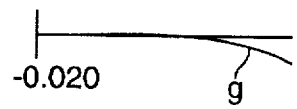
FIG. 5C (I)
FIG. 5C (II)
FIG. 5C (III)
FIG. 5C (IV)
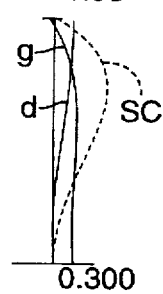
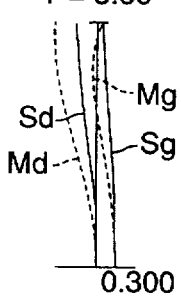
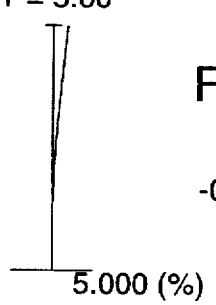

COMPACT HIGH-PERFORMANCE ZOOM LENS

FIELD OF THE INVENTION

This invention relates to zoom lenses, particularly to zoom lenses for use with television cameras and the like.

BACKGROUND OF THE INVENTION

In recent years, video cameras have become extremely popular and the present market trend is toward increasingly smaller and more versatile video cameras. As video cameras are made smaller and more versatile due to rapid advances in electronic technology, the camera's imaging lens needs to be more compact and lightweight.

When using a photographic, television or video camera, it is often desirable to have the flexibility to obtain images of a subject over a range of "magnifications" from wide angle to telephoto without having to change the imaging lens. For this purpose, a "zoom" lens is often used as the imaging lens.

A "zoom" lens has a focal length that can be varied continuously over a defined range to provide variable magnification. Focal-length changes are normally made by moving one or more lens groups in the lens, usually by adjusting the length of the lens barrel. "True" zoom lenses have a parfocal property, i.e., relative motions of the lens groups are coordinated so as to maintain the image formed by the lens in a substantially fixed plane (in contrast to "vari-focal" zoom lenses, where the image iS not maintained in a substantially fixed plane as the focal length is changed). True zoom lenses are normally preferred because they do not need to be refocused after changing the focal length. Differential motion of lens groups is achieved most commonly through the use of one or more high-precision cams in the lens barrel.

Many conventional zoom lenses having a large aperture and a high zoom ratio employ four groups of lenses in a positive-negative-negative-positive or positive-negative-positive-positive refractive power arrangement objectwise to imagewise. Changes in magnification (i.e., "zooming") from the wide-angle end of the zoom lens to the telephoto end are conventionally accomplished by moving the second and third lens groups along the optical axis of the zoom lens.

In order to make a conventional four-group zoom lens more compact while at the same time increasing the zoom ratio, the conventional approach has been to increase the power of each of the lens groups. However, this approach only can be exploited to a limited extent before aberration correction becomes problematic and the zoom lens performance is compromised.

An alternative approach of including additional lens groups so as to more widely distribute the refractive power in order to facilitate aberration correction is disadvantageous because a compact design becomes difficult to achieve.

Therefore, there is a need for a compact, lightweight, high-performance zoom lens having a large aperture and a high zoom ratio.

SUMMARY OF THE INVENTION

The foregoing need is met by the present invention which provides a compact, lightweight, high-performance zoom lens capable of zooming from wide angle to telephoto with a high zoom ratio.

According to one aspect of the present invention, a zoom lens is provided that comprises (objectwise to imagewise) first, second, third, and fourth lens groups disposed along an optical axis, the lens groups having positive, negative, negative, and positive refractive power, respectively. Whenever the lens is zoomed from the wide-angle end to the telephoto end, the second lens group moves linearly along the optical axis objectwise to imagewise; the third lens group moves imagewise then objectwise; and the first and fourth lens groups remain stationary.

The first lens group has a focal length $f_1$ and preferably includes, objectwise to imagewise, a negative lens element, and first, second, and third positive lens elements.

The zoom lens satisfies the following conditions:

$$0.6 < F_T^{1/2}(f_1/f_T) < 1.0 \qquad \text{(i)}$$

$$0.7 < |\beta_{2W}| V^{1/2} < 1.1 \qquad \text{(ii)}$$

wherein $F_T$ is the F-number (i.e., inverse relative aperture) of the zoom lens at the telephoto end, $\beta_{2W}$ is the lateral magnification of the second lens group at the wide-angle end, $f_T$ is the focal length of the zoom lens at the telephoto end, and V is the zoom ratio of the zoom lens.

According to a preferred embodiment, the second lens group includes four lens elements.

According to another aspect of the present invention, zoom lenses are provided having characteristics as set forth in any of several working examples disclosed herein.

According to yet another aspect of the present invention, optical systems are provided that include any of the foregoing zoom lenses in combination with a suitable light sensor disposed at or near the image plane to sense an image of an object produced by the zoom lens; and a recorder for recording the sensed image.

BRIEF DESCRIPTION OF THE DRAWINGS

FIG. 3(A)(I)–3(A)(IV) are plots of spherical aberration, astigmatism, distortion, and lateral chromatic aberration, respectively, for Working Example 1, wide-angle end.

FIGS. 3(B)(I)–3(B)(IV) are plots of spherical aberration, astigmatism, distortion, and lateral chromatic aberration, respectively, for Working Example 1, mid-focal length mode.

FIGS. 3(C)(I)–3(C)(IV) are plots of spherical aberration, astigmatism, distortion, and lateral chromatic aberration, respectively, for Working Example 1, telephoto end.

FIGS. 4(A)(I)–4(A)(IV) are plots of spherical aberration, astigmatism, distortion, and lateral chromatic aberration, respectively, for Working Example 2, wide-angle end.

FIGS. 4(B)(I)–4(B)(IV) are plots of spherical aberration, astigmatism, distortion, and lateral chromatic aberration, respectively, for Working Example 2, mid-focal length mode.

FIGS. 4(C)(I)–4(C)(IV) are plots of spherical aberration, astigmatism, distortion, and lateral chromatic aberration, respectively, for Working Example 2, telephoto end.

FIGS. 5(A)(I)–5(A)(IV) are plots of spherical aberration, astigmatism, distortion, and lateral chromatic aberration, respectively, for Working Example 3, wide-angle end.

FIGS. 5(B)(I)–5(B)(IV) are plots of spherical aberration, astigmatism, distortion, and lateral chromatic aberration, respectively, for Working Example 3, mid-focal length mode.

FIGS. 5(C)(I)–5(C)(IV) are plots of spherical aberration, astigmatism, distortion, and lateral chromatic aberration, respectively, for Working Example 3, telephoto end.

DETAILED DESCRIPTION

Figure 1:
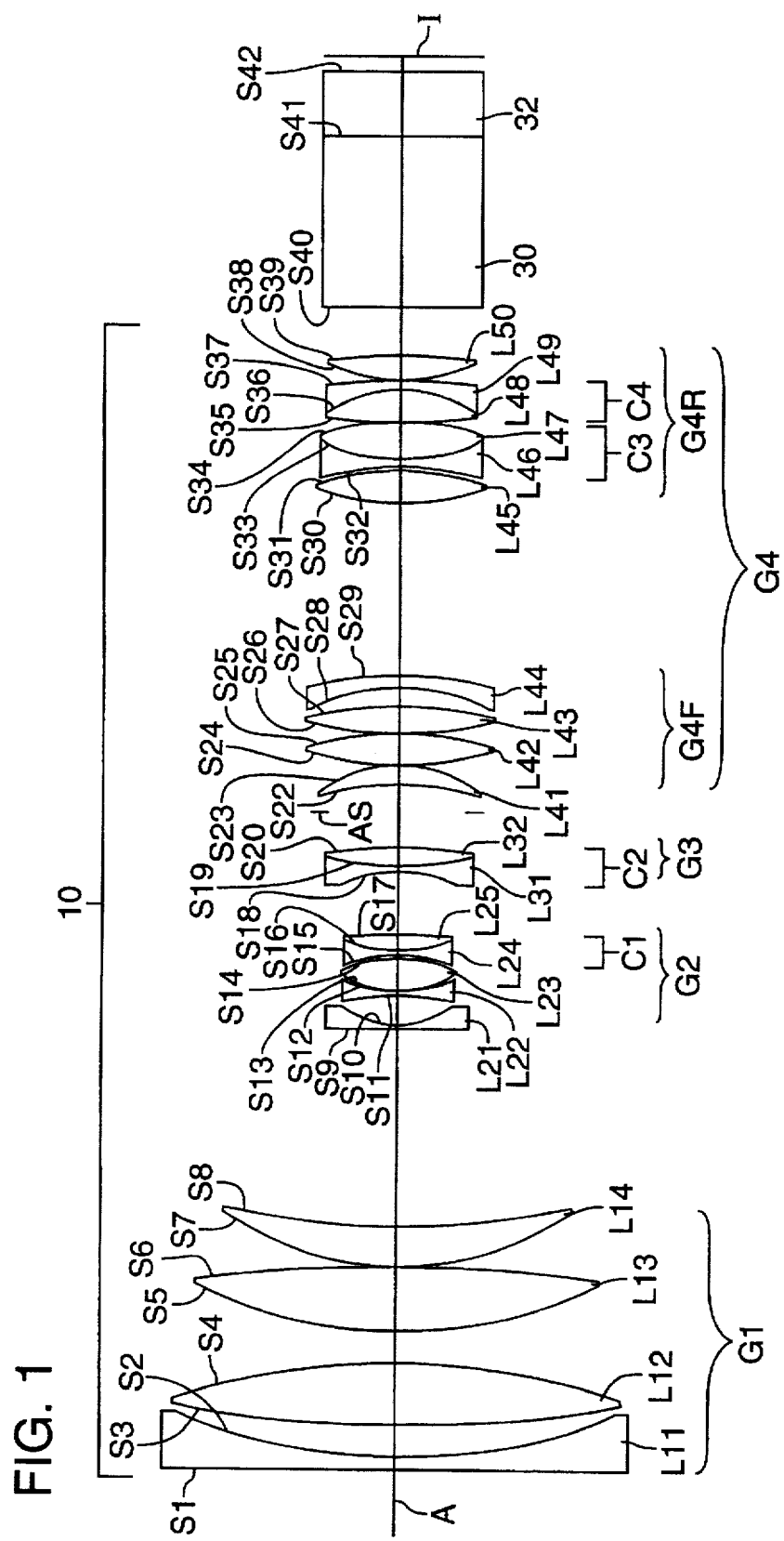
FIG. 1 is an optical diagram of the embodiment of Working Examples 1 through 3.

The following expressions, terms and conventions are used herein:

In an optical diagram, light travels left to right from object to image.

A "positive" distance or direction along an optical axis extends from left to right (i.e., objectwise to imagewise); a "negative" distance or direction extends from right to left (i.e, imagewise to objectwise).

The "radius of curvature" of an optical surface (such as the surface of a lens element) is "positive" when the center of curvature lies to the right of the surface, and "negative" when it lies to the left of the surface.

A "planar" optical surface has an infinite radius.

The "wide-angle end" (abbreviated "WAM") represents a configuration of the lens groups of the zoom lens for producing the most wide-angle image (i.e., widest field of view) producible by the zoom lens.

The "telephoto end" (abbreviated "TM") represents a configuration of the lens groups of the zoom lens for producing the most telephoto (i.e., most magnified) image producible by the zoom lens.

The "mid-focal length mode" (abbreviated "MFLM") denotes a configuration of the lens groups of the zoom lens for producing an image magnification that is mid-way between the wide-angle and telephoto ends.

The "field angle" $2\Omega$ is equal to the twice the angle $\omega$ subtended by the principal ray and the optical axis, as measured at the entrance pupil, for the principal ray intersecting the image plane at the edge of the image field (e.g., the edge of the CCD array). The field angle is largest at the wide-angle end.

"Lateral magnification" is the ratio of the image height h' to the object height h, wherein h and h' are measured in a direction perpendicular (i.e., "laterally") with respect to the optical axis.

The "zoom ratio" (V) is the ratio of the zoomlens magnification at the telephoto end to the zoom-lens magnification at the wide-angle end.

The "magnification ratio" (v) of a lens group is the ratio of the effective lateral magnification of the individual lens group at the wide-angle end to the effective lateral magnification of the individual lens group at the telephoto end.

The "Abbe number" ($V_d$) is the ratio $(n_D-1)/(n_F-n_C)$, where $n_D$ is the index of refraction in D-line light (589.3 nanometer wavelength), $n_F$ is the index of refraction in F-line light (486.1 nanometer wavelength) and $n_c$ is the index of refraction in C-line light (656.3 nanometer wavelength).

"Lateral chromatic aberration," is a measure of the difference in the magnification between F-line light and C-line light, measured in the image plane as an image height difference between the F-line principal rays and C-line principal rays.

The "back focus" ($B_f$) is the distance along the optical axis between the lens surface closest to the image and the image.

"Telecentric" (in image-space) means that the principal rays leaving the exit pupil are parallel to the optical axis.

The "clear aperture" is the diameter of a lens element or aperture stop.

"Linear" axial motion of a lens element or group means motion at a constant velocity along the optical axis.

"Non-linear" axial motion of a lens element or group means motion at a non-constant, i.e., time-varying, velocity along the optical axis.

"High-performance imaging" is a term of art meaning that optical aberrations of the subject lens are corrected to a degree suitable for the particular imaging application.

The present invention provides, inter alia, a compact, light-weight, high-performance zoom lens having large aperture and a high zoom ratio.

FIG. 1 depicts an optical diagram of a preferred embodiment 10 of the present invention showing constituent lens elements and relative positions of the constituent lens groups at the wide-angle end (WAM). The zoom lens 10 is comprised of the following lens groups, arranged coaxially objectwise to imagewise along the optical axis A: (a) a first lens group G1 having positive refractive power; (b) a second lens group G2 having negative refractive power; (c) a third lens group G3 having negative refractive power; and (d) a fourth lens group G4 having positive refractive power.

Referring further to FIG. 1, the lens groups G2 and G3 are axially movable; their coordinated movements are used to effectuate a change in magnification (i.e., focal length) while maintaining the image plane I at a substantially fixed position. As the lens 10 is zoomed from the wide-angle end to the telephoto end, lens group G2 moves linearly imagewise along the optical axis A, while lens group G3 moves nonlinearly (i.e., first imagewise, and then objectwise) along the optical axis A. Lens groups G1 and G4 remain stationary during zooming. However, lens group G1 can be moved axially for focusing.

Referring yet further to FIG. 1, lens group G1 preferably comprises, objectwise to imagewise, a negative lens element L11 (most preferably a negative meniscus lens element), positive (most preferably biconvex) lens elements L12 and L13, and a positive lens element L14 (most preferably a positive meniscus lens element).

Referring yet further to FIG. 1, lens group G2 preferably comprises, objectwise to imagewise, a negative lens element L21 (most preferably a negative meniscus lens element), a negative (most preferably biconcave) lens element L22, a positive (most preferably biconvex) lens element L23, and a compound lens element C1 most preferably including a biconcave lens element L24 and a biconvex lens element L25.

Referring yet further to FIG. 1, lens group G3 preferably comprises, objectwise to imagewise, a compound lens element C2 most preferably including a biconcave lens element L31 and a biconvex lens element L32.

Referring yet further to FIG. 1, the lens group G4 preferably comprises, objectwise to imagewise, a "front" (i.e., objectwise) lens group G4F and a "rear" (i.e., imagewise) lens group G4R. The front lens group G4F preferably comprises, objectwise to imagewise, a positive lens element L41 (most preferably a positive meniscus lens element), a positive (most preferably biconvex) lens element L42, a positive (most preferably biconvex) lens element L43, and a negative lens element L44 (most preferably a negative meniscus lens element). The rear lens group G4R preferably comprises, objectwise to imagewise, a positive (most preferably biconvex) lens element L45, a compound lens element C3 most preferably including a biconcave lens element L46 and a biconvex lens element L47, a compound lens element C4 most preferably including a biconvex lens element L48 and a negative meniscus lens element L49, and a positive (most preferably biconvex) lens element L50.

An aperture stop AS is preferably disposed imagewise of lens group G3 but objectwise of lens group G4.

Referring yet further to FIG. 1, lens element L11 in lens group G1 preferably has an objectwise convex surface S1, and lens element L14 preferably has an objectwise convex surface S7. Desired profiles of the other surfaces S2–S6 and S8 of the lens elements of lens group G1 can be readily ascertained by examination of FIG. 1.

Referring yet further to FIG. 1, lens element L21 in the second lens group G2 preferably has an objectwise convex surface S9. Desired profiles of the other surfaces S10–S17 in the lens group G2 and surfaces S18–S20 of lens group G3 can be readily ascertained by examination of FIG. 1.

Referring yet further to FIG. 1, the lens element L41 in the front lens group G4F of lens group G4 preferably has an imagewise convex surface S23 and the lens element L44 preferably has an imagewise convex surface S29. In the rear lens group G4R of lens group G4, the lens element L49 preferably has an imagewise convex surface S37. Desired profiles of all other surfaces S22, S24–S28, S30–S36, and S38–S39 can be readily ascertained by examination of FIG. 1.

A zoom lens according to the present invention meets the following conditions:

$$0.6 < F_T^{1/2}(f_1/f_T) < 1.0 \quad (1)$$

$$0.7 < |\beta_{2W} \cdot V^{1/2}| < 1.1 \quad (2)$$

wherein $F_T$ is the F-number (inverse relative aperture) of the zoom lens at the telephoto end, $f_1$ is the focal length of first lens group G1, $f_T$ is the overall focal length of the zoom lens at the telephoto end, $\beta_{2W}$ is the lateral magnification of the second lens group G2 at the wide-angle end, and V is the zoom ratio of the zoom lens.

Condition (1) stipulates the optimum refracting power of the zooming components of the zoom lens in order to make said components compact while maintaining imaging performance. By satisfying this condition, it is possible to stipulate the optimum refracting power range of the zooming components according to the zoom ratio and the maximum aperture ratio of the zoom lens.

If $F_T^{1/2}(f_1/f_T)$ were to exceed the upper limit of condition (1), then aberration correction would be more easily obtainable with the zoom lens, but the focal length of the zoom lens would be unacceptably large. Consequently, achieving a compact design of the zoom lens would be difficult.

If $F_T^{1/2}(f_1/f_T)$ were to be below the lower limit of condition (1), then a compact design of the zoom lens would be achievable because the zoom-lens focal length would be sufficiently short. However, aberration correction would be difficult, and unacceptably diminished imaging performance would result. More specifically, if the refracting powers of the second lens group G2 and the third lens group G3 were to be excessively increased, then the Petzval sum of the zoom lens (which is proportional to the lens power) would deteriorate and the apparent F-number of the first lens group G1 at the telephoto end would become too small. Consequently, it would be difficult to correct for spherical aberration at the telephoto end. Moreover, the manufacturing tolerances of the lens design would become exceedingly tight and unforgiving, such that any eccentricities in the lens elements would cause a pronounced deterioration in image quality.

Condition (2) relates to maintaining a compact zoom-lens design while also allowing a sufficiently large clear aperture.

Figure 2:
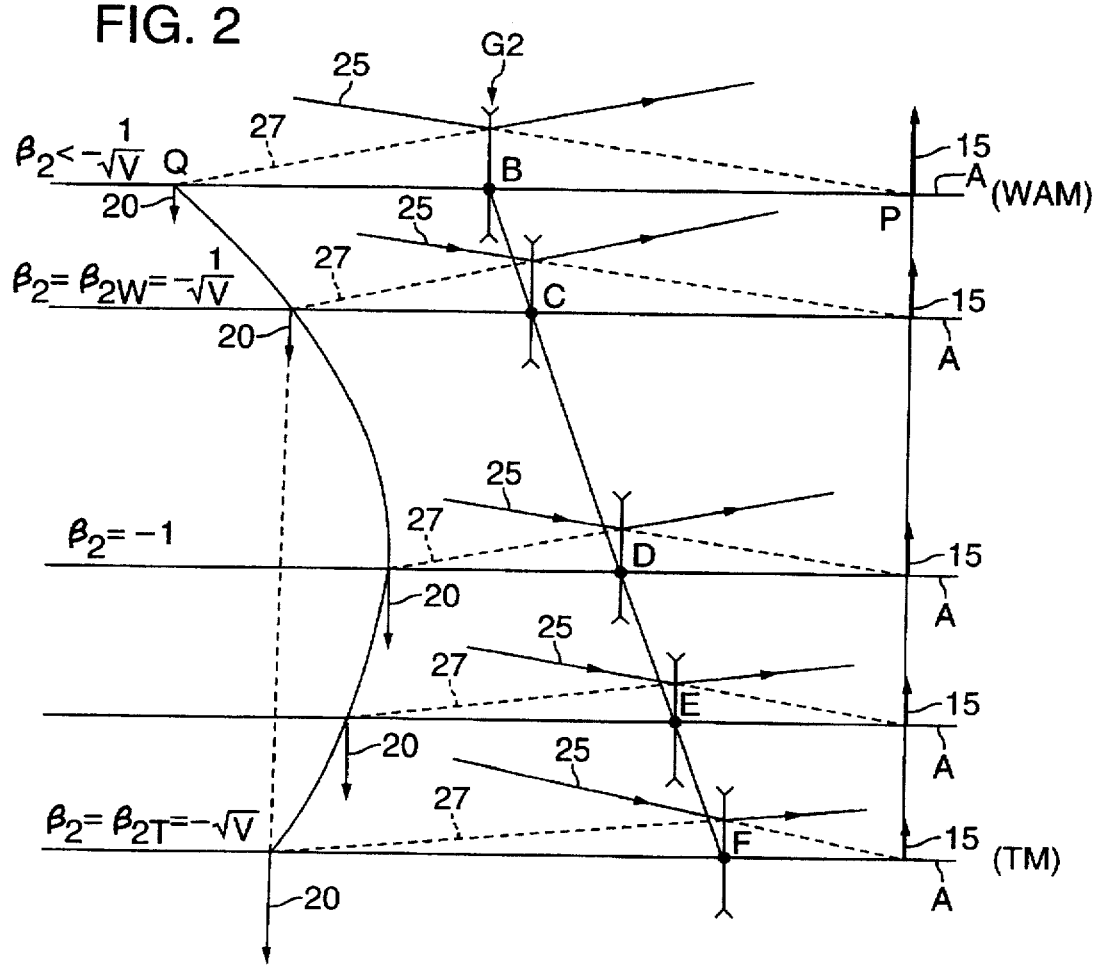
FIG. 2 is a graph depicting the change in magnification and virtual image position due to the axial movement of the second lens group when zooming from the wide-angle end (WAM) to the telephoto end (TM).

FIG. 2 is a graph depicting the change in virtual-image position and lateral magnification of lens group G2 (denoted $\beta_2$ in the Figure) due to the axial movement of lens group G2 when zooming from the wide-angle end (WAM) to the telephoto end (TM). In the Figure, P indicates the axial position of a real image 15 formed by lens group G1, of a distant object (not shown). Q indicates the position of virtual image 20 of the aforesaid object, the virtual image 20 being formed by lens group G2 which, because of its negative refractive power, causes a ray 27 to diverge from the optical axis A. The position Q of virtual image 20 is determined by extending ray 27 backwards (dashed line in FIG. 2) until it intersects the optical axis A.

The axial movement of lens group G2, by itself, causes the virtual image position Q to move axially. This, in turn, changes the overall zoom lens focal length (and hence magnification) and would displace the focal plane I. However, the focal plane I is maintained in a substantially fixed position by axially moving lens group G3 in a manner coordinated with the axial motion of lens group G2.

Continuing with FIG. 2, when $\beta_2$ has a wide-angle value of $\beta_{2W} = -1/V^{1/2}$ and a telephoto value of $\beta_{2T} = -V^{1/2}$, the virtual image position Q is the same, as is the position of lens group G3. Over this range of operation, the magnification ratio $v = \beta_{2T}/\beta_{2W}$ is simply V, the zoom ratio.

The focal length (i.e., refractive power) of lens group G2 is limited by mechanical interference of lens groups G1 and G2 with each other whenever the zoom lens is at the wide-angle end. (At the wide-angle end, the two lens groups G1 and G2 are closest to one another). The focal length $f_2$ of the lens group G2 has the following relationship with the air space $\Delta$ between lens groups G1 and G2 required to prevent mechanical interference between these lens groups at the wide-angle end:

$$f_2 = (f_1 - \Delta)[\beta_{2W}/(1 - \beta_{2W})] \quad (3)$$

According to equation (3), if $\beta_{2W}$ were to be substantially less than $-1/V^{1/2}$, then $|f_2|$ would be unacceptably small. Consequently, the range of motion of lens group G2 would change from between axial positions C and F, to between axial positions B and E, as shown in FIG. 2. $\beta_{2W}$ is preferably within the range established by condition (2) (i.e., $\beta_{2W}$ is preferably slightly less than $-1/V^{1/2}$ in order to achieve a satisfactory balance of aberration control, minimum overall lens length, and a suitable focal length $f_2$ for lens group G2.

Thus, the zooming range of the lens group G2 is limited to the range stipulated by condition (2).

If $|\beta_{2W} \cdot V^{1/2}|$ were to exceed the upper limit of condition (2), then the axial distance over which lens group G2 must move to achieve a given lateral magnification would have to be excessively increased, which undesirably would necessitate an increase in both the overall length of the zoom lens and the clear aperture of lens group G1.

If $|\beta_{2W} \cdot V^{1/2}|$ were to be below the lower limit of condition (2), then the refracting power of lens group G2 would be excessively strong. Consequently, the Petzvall sum would be excessively degraded and aberrations would be difficult to control.

Newer, state-of-the-art video cameras utilize CCD arrays for image recording and thus require an imaging lens that is well-corrected for chromatic aberrations, particularly when the zoom lens is used at high magnification. In order to achieve such high magnification at high performance, the first lens group G1 preferably includes, sequentially objectwise to imagewise, a negative lens element L11 and at least three positive lens groups L12, L13, and L14 (see FIG. 1). In addition, for high performance, the second lens group preferably includes, sequentially objectwise to imagewise, at least four lens elements L21, L22, L23, and L24. In order to favorably correct chromatic aberrations, the following conditions are preferably satisfied:

$$V_{d1} \geq 65.0 \qquad (4)$$

$$V_{d12} \geq 94.0 \qquad (5)$$

$$V_{d13} \geq 81.0 \qquad (6)$$

wherein $V_{d1}$ is the minimum Abbe number of all the positive lens elements in the first lens group G1, $V_{d12}$ is the Abbe number of the positive lens element L12 in the first lens group G1, and $V_{d13}$ is the Abbe number of the positive lens element L13 in the first lens group G1 (Abbe numbers $V_{d1}$, $V_{d12}$, and $V_{d13}$ are with respect to the "d" line ($\lambda$=587.5 nm).) (See FIG. 1.)

Whenever the Abbe numbers $V_{d1}$, $V_{d12}$, and $V_{d13}$, respectively, of the individual positive lens elements in the first lens group G1 satisfy conditions (4)–(6), respectively, it is possible to favorably correct chromatic aberrations, particularly in telephoto.

Further according to the present invention, the negative lens element L11 of the first lens group G1 preferably satisfies condition (7), below. The fourth condition relates to the shape of negative lens element L11, the most objectwise lens in lens group G1 (see FIG. 1). Negative lens element L11 in lens group G1 preferably has a negative meniscus shape and plays an important role in correcting pin-cushion distortion and spherical aberration. The condition is expressed as:

$$-1.4 < (R_2 + R_1)/(R_2 - R_1) < -0.9 \qquad (7)$$

wherein $R_1$ and $R_2$ are the radii of curvature of the objectwise and imagewise surfaces, respectively, of the negative lens element L11.

If $(R_2+R_1)/(R_2-R_1)$ were to exceed the upper limit of condition (4), then undercorrection of spherical aberration would result when the zoom lens is used at the telephoto end. Consequently, the imaging performance of the zoom lens at the telephoto end would suffer.

If $(R_2+R_1)/(R_2-R_1)$ were to be below the lower limit of condition (4), then pin-cushion distortion would arise and could not be readily eliminated. Consequently, the imaging performance of the zoom lens would suffer.

WORKING EXAMPLES

The following Working Examples 1–3 pertain to zoom-lens embodiments according to the present invention. The embodiment of each Working Example comprises, in sequence coaxially objectwise to imagewise, the following components (see FIG. 1): a first lens group G1 having positive overall refractive power, a second lens group G2 having negative overall refractive power, a third lens group G3 having negative overall refractive power, and a fourth lens group G4 having positive overall refractive power. The preferable configuration of lens elements in each lens group is as described above.

FIG. 1 also shows a color-separating prism 30 used to separate red, green, and blue light to form independent signals corresponding to the three primary colors. The color-separating prism 30 is situated coaxially imagewise relative to lens group G4. Disposed coaxially imagewise relative to color-separating prism 30 are parallel plates 32 that represent various types of bandpass filters that can be employed with a zoom lens according to the present invention in order to optimize the performance of the CCD array (not shown, but normally situated at the image plane I). The color-separating prism 30 and parallel plates 32 are preferably utilized in conjunction with the zoom lens in order to further correct for aberrations when the zoom lens is used with a video camera.

Also, an aperture stop AS is interposed coaxially immediately objectwise of lens group G4.

Referring further to FIG. 1, the zoom lens 10 can be zoomed from the wide-angle end to the telephoto end by axially moving lens group G2 in a linear fashion along the optical axis A in coordination with a nonlinear axial movement of lens group G3. Lens groups G1 and G4 remain stationary during zooming.

Each Working Example is set forth in detail in Tables 1–3, 4–6, and 7–9, respectively, wherein the following Table A contains definitions of the variables used, including those variables defined in conjunction with expressions (1) through (7). In Table A, all dimensions are in mm, and refractive indices are at the d-line wavelength of 587.5 nm.

TABLE A

| | |
|---|---|
| f | overall focal length of the zoom lens |
| F | F-number (inverse relative aperture) |
| 2ω | field angle at the wide-angle end |
| AS | aperture stop |

FIGS. 3A–3C, 4A–4C and 5A–5C are aberration plots for working examples 1, 2 and 3 respectively. FIGS. 3A, 4A, and 5A are aberration plots for the wide-angle (i.e., short focal length, low magnification) end.

FIGS. 3B, 4B, and 5B are aberration plots for the midfocal length (intermediate focal length, intermediate magnification) mode.

FIGS. 3C, 4C, and 5C are aberration plots for the telephoto (i.e., long focal length, high magnification) end.

FIGS. 3A(I), 3B(I), 3C(I), 4A(I), 4B(I), 4C(I), 5A(I), 5B(I), and 5C(I) are spherical aberration plots, in which "d" denotes the d-line wavelength of 587.6 nanometers, "g" denotes the G-line wavelength of 435.8 nanometers, and "SC" denotes the sine condition, plotted as a broken line.

FIGS. 3A(II), 3B(II), 3C(II), 4A(II), 4B(II), 4C(II), 5A(II), 5B(II), and 5C(II) are aberration plots for astigmatism, in which the solid lines Sd and Sg represent the sagittal image surface with respect to d-line and G-line wavelengths, respectively, while the broken lines Md and Mg represent the meridional image surface with respect to d-line and G-line wavelengths, respectively.

FIGS. 3A(III), 3B(III), 3C(III), 4A(III), 4B(III), 4C(III), 5A(III), 5B(III), and 5C(III) are aberration plots for distortion, in which Y is the final image height.

FIGS. 3A(IV), 3B(IV), 3C(IV), 4A(IV), 4B(IV), 4C(IV), 5A(IV), 5B(IV), and 5C(IV) are aberration plots for lateral chromatic aberration, in which the G-line wavelength is the reference wavelength.

Working Example 1

With respect to this Working Example, the various optical parameters are listed in Tables 1–3, below.

TABLE 1 f = 8.75 – 40.0 – 126.9 mm (WAM to MFLM to TM)
F = 1.72 – 1.72 – 1.93 (WAM to MFLM to TM)
2ω = 65.2 – 15.9 – 5.1° (WAM to MFLM to TM)

| Surface | R | D | $V_d$ | n |
|---|---|---|---|---|
| S1 | 1710.20 | 2.800 | 27.61 | 1.755200 |
| S2 | 112.7796 | 5.7653 | | |
| S3 | 205.6837 | 11.7500 | 94.97 | 1.438750 |
| S4 | –158.5765 | 7.3006 | | |
| S5 | 91.5508 | 12.4000 | 82.52 | 1.497820 |
| S6 | –375.5570 | .01000 | | |
| S7 | 57.9808 | 8.0000 | 68.33 | 1.592400 |
| S8 | 154.7114 | (d8) | | |
| S9 | 142.0576 | 0.9000 | 43.35 | 1.840421 |
| S10 | 17.5913 | 5.8000 | | |
| S11 | –50.9553 | 0.9000 | 43.35 | 1.840421 |
| S12 | 26.6049 | 0.1000 | | |
| S13 | 22.2776 | 6.7000 | 32.17 | 1.672700 |
| S14 | –22.1115 | 0.6500 | | |
| S15 | –19.2022 | 1.0000 | 39.82 | 1.869940 |
| S16 | 29.0000 | 3.4000 | 23.01 | 1.860741 |
| S17 | –114.2127 | (d17) | | |
| S18 | –29.2573 | 1.0000 | 43.35 | 1.840421 |
| S19 | 46.8024 | 3.4000 | 23.01 | 1.860741 |
| S20 | –219.7862 | (d20) | | |
| AS | ∞ | 4.6000 | | |
| S22 | –68.7288 | 3.9000 | 58.90 | 1.518230 |
| S23 | –31.2427 | 0.2000 | | |
| S24 | 67.1786 | 6.0000 | 82.52 | 1.497820 |
| S25 | –87.5920 | 0.2000 | | |
| S26 | 69.2910 | 5.4000 | 65.77 | 1.464500 |
| S27 | –129.2852 | 3.8000 | | |
| S28 | –51.2578 | 2.0000 | 28.39 | 1.795040 |
| S29 | –84.8131 | 33.8849 | | |
| S30 | 61.5864 | 5.8000 | 65.77 | 1.464500 |
| S31 | –53.8209 | 0.8000 | | |
| S32 | –68.6635 | 1.7000 | 39.82 | 1.869940 |
| S33 | 47.2488 | 7.4000 | 65.77 | 1.464500 |
| S34 | –41.2692 | 0.2000 | | |
| S35 | 119.7097 | 6.3000 | 56.41 | 1.501370 |
| S36 | –30.4299 | 1.7000 | 39.82 | 1.869940 |
| S37 | –150.1397 | 0.2000 | | |
| S38 | 38.1423 | 4.6000 | 65.77 | 1.464500 |
| S39 | –337.1248 | 10.0000 | | |
| S40 | ∞ | 33.5000 | 53.87 | 1.559200 |
| S41 | ∞ | 12.7000 | 64.10 | 1.516800 |
| S42 | ∞ | $B_f$ = 2.7128 | | |

TABLE 2

Zooming Focal Lengths and Distances:

| Variable | WAM | MFLM | TM |
|---|---|---|---|
| f | 8.75 | 40.00 | 126.90 |
| d8 | 0.5906 | 38.9711 | 51.9753 |
| d17 | 56.4600 | 12.2117 | 3.1593 |
| d20 | 1.5067 | 7.3745 | 3.4227 |

TABLE 3

Values and Conditions $F_T = 1.92$
$f_T = 126.94$
$V = 14.51$
$R_2 = 112.7796$
$F_T^{1/2}(f_1/f_T) = 0.83$
$|\beta_{2w} \cdot V^{1/2}| = 0.92$
$V_{d1} = 68.33$
$V_{d11} = 94.97$
$f_1 = 76.44$
$\beta_{2w} = -0.242$
$R_1 = 1710.2700$

TABLE 3-continued

Values and Conditions $V_{d12} = 82.52$
$(R_2 + R_1)/(R_2 - R_1) = -1.14$

With respect to this Working Example, FIGS. 3A(I–IV), 3B(I–IV), and 3C(I–IV) show plots corresponding to the wide-angle end, the mid-focal length mode, and the telephoto end, respectively, for spherical aberration (3A(I), 3B(I), and 3C(I)), astigmatism (3A(II), 3B(II), and 3C(II)), distortion (3A(III), 3B(III), and 3C(III)), and lateral chromatic aberration (3A(IV), 3B(IV), and 3C(IV)). As is clear from the foregoing plots, the configuration of this Working Example is well-corrected for aberrations over the entire range of focal lengths and is suitable for achieving the objectives of the present invention.

Working Example 2

With respect to this Working Example, the various optical parameters are listed in Tables 4–6, below.

TABLE 4 f = 8.75 – 40.0 – 126.9 mm (WAM to MFLM to TM)
F = 1.72 – 1.72 – 1.92 (WAM to MFLM to TM)
2ω = 65.2 – 15.9 – 5.1° (WAM to MFLM to TM)

| Surface | R | D | $V_d$ | n |
|---|---|---|---|---|
| S1 | 2009.0255 | 2.6000 | 27.61 | 1.755200 |
| S2 | 114.1286 | 5.6381 | | |
| S3 | 217.5082 | 11.7500 | 94.97 | 1.438750 |
| S4 | –152.9623 | 7.2466 | | |
| S5 | 90.5545 | 12.5000 | 82.52 | 1.497820 |
| S6 | –363.6357 | 0.1000 | | |
| S7 | 57.1644 | 7.9500 | 68.33 | 1.592400 |
| S8 | 144.4734 | (d8) | | |
| S9 | 145.0000 | 0.9000 | 43.35 | 1.840421 |
| S10 | 17.3239 | 5.8000 | | |
| S11 | –50.0122 | 0.9000 | 46.35 | 1.840421 |
| S12 | 27.9469 | 0.1000 | | |
| S13 | 23.1761 | 6.3000 | 32.17 | 1.672700 |
| S14 | –23.7337 | 0.6500 | | |
| S15 | –20.2516 | 1.0000 | 39.82 | 1.869940 |
| S16 | 28.0000 | 3.4000 | 23.01 | 1.860741 |
| S17 | –109.8183 | (d17) | | |
| S18 | –29.2506 | 1.0000 | 43.35 | 1.840421 |
| S19 | 46.8024 | 3.4000 | 23.01 | 1.860741 |
| S20 | –219.4448 | (d20) | | |
| AS | ∞ | 4.6000 | | |
| S22 | –69.1960 | 3.9000 | 58.90 | 1.518230 |
| S23 | –31.1338 | 0.2000 | | |
| S24 | 66.2411 | 6.0000 | 82.52 | 1.497820 |
| S25 | –87.2663 | 0.2000 | | |
| S26 | 68.8613 | 5.4000 | 65.77 | 1.464500 |
| S27 | –139.6810 | 3.8000 | | |
| S28 | –51.3652 | 2.0000 | 28.39 | 1.795040 |
| S29 | –85.6608 | 33.7995 | | |
| S30 | 60.9570 | 5.8000 | 65.77 | 1.464500 |
| S31 | –53.7610 | 0.8000 | | |
| S32 | –68.2740 | 1.7000 | 39.82 | 1.869940 |
| S33 | 46.7517 | 7.4000 | 65.77 | 1.464500 |
| S34 | –41.3056 | 0.2000 | | |
| S35 | 119.5650 | 6.3000 | 56.41 | 1.501370 |
| S36 | –30.7503 | 1.7000 | 39.82 | 1.869940 |
| S37 | –147.3670 | 0.2000 | | |
| S38 | 38.4765 | 4.6000 | 65.77 | 1.464500 |
| S39 | –352.1965 | 10.0000 | | |
| S40 | ∞ | 33.5000 | 53.87 | 1.559200 |
| S41 | ∞ | 12.7000 | 64.10 | 1.516800 |
| S42 | ∞ | $B_f$ = 2.7134 | | |

TABLE 5

Zooming Focal Lengths and Distances

| Variable | WAM | MFLM | TM |
|---|---|---|---|
| f | 8.75 | 40.00 | 126.90 |
| d8 | 0.6064 | 38.9896 | 51.9911 |
| d17 | 56.4893 | 12.2410 | 3.1886 |
| d20 | 1.6061 | 7.4739 | 3.5221 |

TABLE 6

Values and Conditions $F_T = 1.91$          $f_1 = 76.44$
$f_T = 126.93$        $\beta_{2w} = -0.242$
$V = 14.51$           $R_1 = 2009.0255$
$R_2 = 114.1286$
$F_T^{1/2}(f_1/f_T) = 0.83$
$|\beta_{2w} \cdot V^{1/2}| = 0.92$
$V_{d1} = 68.33$
$V_{d11} = 94.97$
$V_{d12} = 82.52$
$(R_2 + R_1)/(R_2 - R_1) = -1.12$ With respect to this Working Example, FIGS. 4A(I–IV), 4B(I–IV) and 4C(I–IV) show plots corresponding to the wide-angle end, the mid-focal length mode, and the telephoto end, respectively, for spherical aberration (4A(I), 4B(I), and 4C(I)), astigmatism (4A(II), 4B(II), and 4C(II)), distortion (4A(III), 4B(III), and 4C(III)), and lateral chromatic aberration (4A(IV), 4B(IV), and 4C(IV)). As is clear from the foregoing plots, the configuration of this Working Example is well-corrected for aberrations over the entire range of focal lengths and is suitable for achieving the objectives of the present invention.

Working Example 3

With respect to this Working Example, the various optical parameters are listed in Tables 7–9, below.

TABLE 7

$f = 8.75 - 40.0 - 127.0$ mm (WAM to MFLM to TM)
$F = 1.75 - 1.75 - 1.93$ (WAM to MFLM to TM)
$2\omega = 65.2 - 15.9 - 5.1°$ (WAM to MFLM to TM)

| Surface | R | D | $V_d$ | n |
|---|---|---|---|---|
| S1 | 1115.6326 | 2.8000 | 27.61 | 1.755200 |
| S2 | 108.1075 | 6.4100 | | |
| S3 | 170.3843 | 11.6000 | 94.97 | 1.438750 |
| S4 | −184.6859 | 7.2289 | | |
| S5 | 93.8244 | 11.9000 | 82.52 | 1.497820 |
| S6 | −387.4798 | 0.1000 | | |
| S7 | 57.6071 | 8.2000 | 68.33 | 1.592400 |
| S8 | 158.5193 | (d8) | | |
| S9 | 161.0946 | 0.9000 | 43.35 | 1.840421 |
| S10 | 17.8461 | 5.8000 | | |
| S11 | −58.2138 | 0.9000 | 43.35 | 1.840421 |
| S12 | 26.7117 | 0.1000 | | |
| S13 | 22.2066 | 6.7000 | 32.17 | 1.672700 |
| S14 | −22.2066 | 0.6500 | | |
| S15 | −19.2914 | 1.0000 | 39.82 | 1.869940 |
| S16 | 27.0248 | 3.4000 | 23.01 | 1.860741 |
| S17 | −147.6465 | (d17) | | |
| S18 | −29.9088 | 1.0000 | 43.35 | 1.840421 |
| S19 | 46.7967 | 3.4000 | 23.01 | 1.860741 |
| S20 | −257.6272 | (d20) | | |
| AS | ∞ | 4.6000 | | |

TABLE 7-continued $f = 8.75 - 40.0 - 127.0$ mm (WAM to MFLM to TM)
$F = 1.75 - 1.75 - 1.93$ (WAM to MFLM to TM)
$2\omega = 65.2 - 15.9 - 5.1°$ (WAM to MFLM to TM)

| Surface | R | D | $V_d$ | n |
|---|---|---|---|---|
| S22 | −67.0175 | 3.9000 | 58.90 | 1.518230 |
| S23 | −30.7031 | 0.2000 | | |
| S24 | 68.6395 | 6.0000 | 82.52 | 1.497820 |
| S25 | −86.0173 | 0.2000 | | |
| S26 | 74.2999 | 5.4000 | 65.77 | 1.464500 |
| S27 | −89.8710 | 3.8000 | | |
| S28 | −50.1094 | 2.0000 | 28.39 | 1.795040 |
| S29 | −86.9346 | 33.9945 | | |
| S30 | 61.3751 | 5.8000 | 65.77 | 1.464500 |
| S31 | −54.4709 | 0.8000 | | |
| S32 | −67.6825 | 1.7000 | 39.82 | 1.869940 |
| S33 | 49.3685 | 7.4000 | 65.77 | 1.464500 |
| S34 | −40.5739 | 0.2000 | | |
| S35 | 123.8754 | 6.3000 | 56.41 | 1.501370 |
| S36 | −30.2744 | 1.7000 | 39.82 | 1.869940 |
| S37 | −162.6478 | 0.2000 | | |
| S38 | 38.2046 | 4.6000 | 65.77 | 1.464500 |
| S39 | −359.3304 | 10.0000 | | |
| S40 | ∞ | 33.5000 | 53.87 | 1.559200 |
| S41 | ∞ | 12.7000 | 64.10 | 1.516800 |
| S42 | ∞ | $B_f = 2.8150$ | | |

TABLE 8

Zooming Focal Lengths and Distances

| Variable | WAM | MFLM | TM |
|---|---|---|---|
| f | 8.75 | 40.00 | 127.00 |
| d8 | 0.5523 | 38.9326 | 51.9345 |
| d17 | 56.6844 | 12.4359 | 3.3903 |
| d20 | 1.4408 | 7.3090 | 3.3527 |

TABLE 9

Values and Conditions $F_T = 1.93$          $f_1 = 76.44$
$f_T = 126.95$        $\beta_{2w} = -0.242$
$V = 14.51$           $R_1 = 1115.6326$
$R_2 = 108.1075$
$F_T^{1/2}(f_1/f_T) = 0.84$
$|\beta_{2w} \cdot V^{1/2}| = 0.92$
$V_{d1} = 68.33$
$V_{d11} = 94.97$
$V_{d12} = 82.52$
$(R_2 + R_1)/(R_2 - R_1) = -1.21$ With respect to this Working Example, FIGS. 5A(I–IV), 5B(I–IV) and 5C(I–IV) show plots corresponding to the wide-angle end, the mid-focal length mode, and the telephoto end, respectively, for spherical aberration (5A(I), 5B(I), and 5C(I)), astigmatism (5A(II), 5B(II), and 5C(II)), distortion (5A(III), 5B(III), and 5C(III)), and lateral chromatic aberration (5A(IV), 5B(IV), and 5C(IV)). As is clear from the foregoing plots, the configuration of this Working Example is well-corrected for aberrations over the entire range of focal lengths and is suitable for achieving the objectives of the present invention.

While the present invention has been described in connection with preferred embodiments, it will be understood that it is not limited to those embodiments. On the contrary, it is intended to cover all alternatives, modifications, and equivalents as may be included within the spirit and scope of the invention as defined in the appended claims.

What is claimed is:

1. A zoom lens comprising, objectwise to imagewise:

first, second, third, and fourth lens groups having positive, negative, negative, and positive refractive power, respectively, disposed on an optical axis;

the first lens group having a focal length $f_1$ and including, sequentially objectwise to imagewise, a negative lens element and first, second, and third positive lens elements;

each of the first, second, and third positive lens elements in the first lens group having an Abbe number, wherein $V_{d1}$ is the minimum Abbe number of all said positive lens elements, $V_{d12}$ is the Abbe number of the first positive lens element, and $V_{d13}$ is the Abbe number of the second positive lens element, the zoom lens satisfying the conditions:

$$V_{d1} \geq 65.0$$

$$V_{d12} \geq 94.0$$

$$V_{d13} > 81.0;$$

the second lens group comprising at least four lens elements;

the zoom lens being operable to zoom over a zoom ratio V from a wide-angle end to a telephoto end, at which wide-angle end the second lens group has a lateral magnification $\beta_{2W}$ and at which telephoto end the zoom lens has a focal length $f_T$ and an F-number $F_T$, wherein, during zooming from the wide-angle end to the telephoto end, the second lens group moves linearly objectwise to imagewise on the optical axis, the third lens group moves on the optical axis, and the first and fourth lens groups remain stationary on the optical axis; and the zoom lens satisfying the conditions:

$$0.6 < F_T^{1/2}(f_1/f_T) < 1.0$$

$$0.7 < |\beta_{2W} \cdot V^{1/2}| < 1.1.$$

2. The zoom lens of claim 1, wherein, in the first lens group, the negative lens element has an objectwise surface having a radius of curvature $R_1$ and an imagewise surface having a radius of curvature $R_2$, the zoom lens satisfying the condition:

$$-1.4 < (R_2 + R_1)/(R_2 - R_1) < -0.9.$$

3. The zoom lens of claim 1, further comprising an aperture stop disposed coaxially objectwise of the fourth lens group.

4. The zoom lens of claim 1, wherein the fourth lens group comprises an objectwise lens subgroup and an imagewise lens subgroup.

5. An optical system, comprising:

(a) the zoom lens of claim 1 operable to form an image at an image plane of an object;

(b) a light sensor operable to sense the image; and (c) a recorder for recording the sensed image.

6. An optical system, comprising:

(a) the zoom lens of claim 1, operable to form an image at an image plane; and (b) a color-separating prism disposed between the zoom lens and the image plane.

7. The optical system of claim 6 further comprising an optical bandpass filter disposed between the color-separating prism and the image plane.

8. An optical system comprising:

(a) the zoom lens of claim 1 operable to form an image at an image plane; and (b) a light-sensitive recording medium operable to record the image.

9. The zoom lens of claim 1, wherein, in the first lens group, the negative lens element has an objectwise surface having a radius of curvature $R_1$ and an imagewise surface having a radius of curvature $R_2$, the zoom lens satisfying the condition:

$$-1.4 < (R_2 + R_1)/(R_2 - R_1) < -0.9$$

10. The zoom lens of claim 4, wherein each of the objectwise and imagewise lens subgroups has a positive refractive power.

11. The zoom lens of claim 10 wherein the objectwise lens subgroup comprises, objectwise to imagewise, three positive lens elements and a negative lens element.

12. A zoom lens comprising, objectwise to imagewise:

first, second, third, and fourth lens groups having positive, negative, negative, and positive refractive power, respectively, disposed on an optical axis;

the first lens group having a focal length $f_1$ and including, sequentially objectwise to imagewise, a negative lens element and first, second, and third positive lens elements;

the zoom lens being operable to zoom over a zoom ratio V from a wide-angle end to a telephoto end, at which wide-angle end the second lens group has a lateral magnification $\beta_{2W}$ and at which telephoto end the zoom lens has a focal length $f_T$ and an F-number $F_T$, wherein, during zooming from the wide-angle end to the telephoto end, the second lens group moves linearly objectwise to imagewise on the optical axis, the third lens group moves on the optical axis, and the first and fourth lens groups remain stationary on the optical axis;

the zoom lens satisfying the conditions:

$$0.6 < F_T^{1/2}(f_1/f_T) < 1.0$$

$$0.7 < |\beta_{2W} \cdot V^{1/2}| < 1.1;$$

and the third lens group being operable to move, during zooming from the wide-angle end to the telephoto end, first imagewise then objectwise.

13. A zoom lens having characteristics as set forth in Tables 1, 2, 3, and Table A.

14. A zoom lens having characteristics as set forth in Tables 4, 5, 6, and Table A.

15. A zoom lens having characteristics as set forth in Tables 7, 8, 9, and Table A.

16. A zoom lens comprising, objectwise to imagewise:

first, second, third, and fourth lens groups having positive, negative, negative, and positive refractive power, respectively, disposed on an optical axis;

the first lens group having a focal length $f_1$ and including, sequentially objectwise to imagewise, a negative lens element and first, second, and third positive lens elements;

the fourth lens group comprising an objectwise lens subgroup and an imagewise lens subgroup, each of the objectwise and imagewise lens subgroups having a positive refractive power;

the objectwise lens subgroup comprising, objectwise to imagewise, three positive lens elements and a negative lens element;

the zoom lens being operable to zoom over a zoom ratio V from a wide-angle end to a telephoto end, at which wide-angle end the second lens group has a lateral magnification $\beta_{2W}$ and at which telephoto end the zoom lens has a focal length $f_T$ and an F-number $F_T$, wherein, during zooming from the wide-angle end to the telephoto end, the second lens group moves linearly objectwise to imagewise on the optical axis, the third lens group moves on the optical axis, and the first and fourth lens groups remain stationary on the optical axis;

the zoom lens satisfying the conditions:

$$0.6 < F_T^{1/2}(f_1/f_T) < 1.0$$

$$0.7 < |\beta_{2W}| V^{1/2} < 1.1;$$

and wherein the imagewise lens subgroup comprises, objectwise to imagewise, a positive lens element, first, second, and third compound lenses, and a negative lens element.

17. A zoom lens comprising, objectwise to imagewise:

first, second, third, and fourth lens groups having positive, negative, negative, and positive refractive power, respectively, disposed on an optical axis;

the first lens group having a focal length $f_1$ and including, sequentially objectwise to imagewise, a negative lens element and first, second, and third positive lens elements;

the zoom lens being operable to zoom over a zoom ratio V from a wide-angle end to a telephoto end, at which wide-angle end the second lens group has a lateral magnification $\beta_{2W}$ and at which telephoto end the zoom lens has a focal length $f_T$ and an F-number $F_T$, wherein, during zooming from the wide-angle end to the telephoto end, the second lens group moves linearly objectwise to imagewise on the optical axis, the third lens group moves on the optical axis, and the first and fourth lens groups remain stationary on the optical axis;

the zoom lens satisfying the conditions:

$$0.6 < F_T^{1/2}(f_1/f_T) < 1.0$$

$$0.7 < |\beta_{2W}| V^{1/2} < 1.1;$$

wherein the third lens group moves, during zooming from the wide-angle end to the telephoto end, first imagewise then objectwise; and wherein the third lens group comprises a compound lens including, objectwise to imagewise, a biconcave lens element and a biconvex lens element.

18. A zoom lens comprising, objectwise to imagewise:

first, second, third, and fourth lens groups having positive, negative, negative, and positive refractive power, respectively, disposed on an optical axis;

the second lens group comprising at least four lens components;

the first lens group having a focal length $f_1$ and comprising, sequentially objectwise to imagewise, a negative lens element and first, second, and third positive lens elements, the negative lens element having an objectwise surface having a radius of curvature $R_1$ and an imagewise surface having a radius of curvature $R_2$;

the zoom lens being operable to zoom over a zoom ratio V from a wide-angle end to a telephoto end, at which wide-angle end the second lens group has a lateral magnification $\beta_{2W}$ and at which telephoto end the zoom lens has a focal length $f_T$ and an F-number $F_T$, wherein, during zooming from the wide-angle end to the telephoto end, the second lens group moves linearly objectwise to imagewise on the optical axis, the third lens group moves on the optical axis, and the first and fourth lens groups remain stationary on the optical axis; and the zoom lens satisfying the conditions:

$$0.6 < F_T^{1/2}(f_1/f_T) < 1.0$$

$$0.7 < |\beta_{2W}| V^{1/2} < 1.1$$

$$-1.4 < (R_2 + R_1)/(R_2 - R_1) < -1.2.$$

* * * * *

UNITED STATES PATENT AND TRADEMARK OFFICE
CERTIFICATE OF CORRECTION

PATENT NO. : 5,703,725
DATED : December 30, 1997
INVENTOR(S) : Masayuki Aoki

It is certified that error appears in the above-identified patent and that said Letters Patent is hereby corrected as shown below:

In the Abstract: line 13,

"$0.7 < I\beta_{2w} \cdot V^{\frac{1}{2}1} < 1.1$" should be --$0.7 < |\beta_{2w} \cdot V^{\frac{1}{2}}| < 1.1$--.

Column 1, line 30, "iS" should be --is--.

Column 3, line 33, "$2\Omega$" should be --$2\omega$--.

Column 3, line 43, "zoomlens" should be --zoom-lens--.

Column 8, line 16, "nonlinear" should be --non-linear--.

Column 8, line 25, "587.5 am" should be --587.5 nm--.

Column 8, line 27, Table A is incomplete. Table A in its entirety should read as follows:

--TABLE A

| | |
|---|---|
| f | overall focal length of the zoom lens |
| F | F-number (inverse relative aperture) |
| $2\omega$ | field angle at the wide-angle end |
| AS | aperture stop |
| n | refractive index |
| $V_d$ | Abbe number |
| $B_f$ | back focus |

UNITED STATES PATENT AND TRADEMARK OFFICE
CERTIFICATE OF CORRECTION

PATENT NO. : 5,703,725
DATED : December 30, 1997
INVENTOR(S) : Masayuki Aoki

It is certified that error appears in the above-identified patent and that said Letters Patent is hereby corrected as shown below:

| | |
|---|---|
| S1, S2, . . . | surface numbers, numbered from objectwise to imagewise |
| $R_1$ | radius of curvature of the objectwise surface of the negative lens element L11 |
| $R_2$ | radius of curvature of the imagewise surface of the negative lens element L11 |
| R | radius of curvature of a lens-element surface |
| $F_T$ | F-number of the zoom lens at the telephoto end |
| $f_1$ | focal length of the first lens group |
| $f_T$ | overall focal length of the zoom lens at the telephoto end |
| $\beta_2$ | lateral magnification of the second lens group |
| $\beta_{2w}$ | lateral magnification of the second lens group at the wide-angle end |
| V | zoom ratio of the zoom lens |
| $V_{d1}$ | minimum Abbe number of all the positive lens elements in the first lens group G1 |
| $V_{d11}, V_{d12}, V_{d13}$ | Abbe numbers of the lens elements L11, L12, and L13 of the first lens group |
| d8, d17, d20 | axial distances between the lens element surfaces S8 and S9, S17 and S18, and S20 and AS, respectively -- |

Column 12, line 22, Table 7, in the second column of the row beginning with "S39", "-359.3304" should be -- -259.3304 --.

UNITED STATES PATENT AND TRADEMARK OFFICE
CERTIFICATE OF CORRECTION

PATENT NO. : 5,703,725
DATED : December 30, 1997
INVENTOR(S) : Masayuki Aoki

It is certified that error appears in the above-identified patent and that said Letters Patent is hereby corrected as shown below:

Column 12, line 24, Table 7, in the third column of the row beginning with "S42", "$B_f = 2.8150$" should be --$B_f = 0.8150$--.

Column 13, line 43, "$0.7 < |\beta_{2w} \cdot V^{1/2} < 1.1$" should be --$0.7 < |\beta_{2w} \cdot V^{1/2}| < 1.1$--.

Column 14, line 32, "eIement" should be --element--.

Column 14, line 48, "$0.7 < |\beta_{2w} \cdot V^{1/2} < 1.1$" should be --$0.7 < |\beta_{2w} \cdot V^{1/2}| < 1.1$--.

Column 16, line 6, "$0.6 < F_T^{1/2})f_1/f_T) < 1/0$" should be --$0.6 < F_T^{1/2}(f_1/f_T) < 1.0$--.

Column 16, line 45, "$-1.4 < (R_2+R_1)/(R_2-R_1) < -1.2$" should be -- $-1.4 < (R_2 + R_1)/(R_2 - R_1) < -1.1$ --.

Signed and Sealed this

Fifteenth Day of September, 1998

*Attest:*

BRUCE LEHMAN

*Attesting Officer*  Commissioner of Patents and Trademarks